(12) United States Patent
Knopp

(10) Patent No.: US 10,443,890 B2
(45) Date of Patent: Oct. 15, 2019

(54) WATER HEATER WITH THERMALLY ISOLATING PREHEATER AND METHOD OF USE

(71) Applicant: Benjamin Thomas Knopp, Henrico, VA (US)

(72) Inventor: Benjamin Thomas Knopp, Henrico, VA (US)

( * ) Notice: Subject to any disclaimer, the term of this patent is extended or adjusted under 35 U.S.C. 154(b) by 113 days.

(21) Appl. No.: 15/387,716

(22) Filed: Dec. 22, 2016

(65) Prior Publication Data

US 2017/0205114 A1     Jul. 20, 2017

Related U.S. Application Data

(60) Provisional application No. 62/278,459, filed on Jan. 14, 2016.

(51) Int. Cl.

| F24H 9/00 | (2006.01) |
| F24H 1/20 | (2006.01) |
| F28D 7/06 | (2006.01) |
| F28D 7/16 | (2006.01) |
| F28D 20/00 | (2006.01) |
| F28D 20/02 | (2006.01) |

(52) U.S. Cl.
CPC ........... *F24H 9/0005* (2013.01); *F24H 1/208* (2013.01); *F28D 7/06* (2013.01); *F28D 7/16* (2013.01); *F28D 20/0034* (2013.01); *F28D 20/021* (2013.01); *F24D 2220/08* (2013.01); *F24D 2220/10* (2013.01); *Y02E 60/142* (2013.01); *Y02E 60/145* (2013.01)

(58) Field of Classification Search
CPC .... F24H 9/0005; F24H 9/0015; F24H 9/0021; F24H 1/208; F24D 2220/08; F24D 2220/10; F28D 20/00; B65D 88/744
See application file for complete search history.

(56) References Cited

U.S. PATENT DOCUMENTS

| 3,133,590 | A | * | 5/1964 | Lowe | F24H 1/208 |
| | | | | | 165/132 |
| 3,962,560 | A | * | 6/1976 | Braathen | F24H 1/202 |
| | | | | | 392/450 |
| 5,421,404 | A | * | 6/1995 | Kale | F24H 9/124 |
| | | | | | 122/13.01 |
| 6,047,106 | A | * | 4/2000 | Salyer | F24H 7/0433 |
| | | | | | 126/400 |
| 6,233,958 | B1 | | 5/2001 | Mei et al. | |
| 6,493,507 | B2 | | 12/2002 | Salyer | |
| 7,570,877 | B1 | * | 8/2009 | Huang | F24H 1/202 |
| | | | | | 392/452 |
| 8,887,672 | B2 | | 11/2014 | Junge | |
| 2003/0131623 | A1 | | 7/2003 | Suppes | |
| 2010/0034528 | A1 | * | 2/2010 | Willis | F24D 17/0068 |
| | | | | | 392/451 |
| 2011/0239673 | A1 | * | 10/2011 | Junge | F28D 20/02 |
| | | | | | 62/238.7 |

(Continued)

*Primary Examiner* — Steven S Anderson, II
(74) *Attorney, Agent, or Firm* — Clark & Brody

(57) ABSTRACT

A water heater includes a thermally isolating preheater using a phase change material for increased efficiency. Cold water passes through the preheater and is heated using the phase change material therein. Due to the preheater, heated water is supplied to the water contained in the water heater storage tank.

16 Claims, 5 Drawing Sheets

(56) References Cited

U.S. PATENT DOCUMENTS

| | | | |
|---|---|---|---|
| 2011/0240275 A1* | 10/2011 | Piggott | F28D 1/0426 165/173 |
| 2014/0202549 A1* | 7/2014 | Hazzard | F24H 9/2007 137/3 |
| 2014/0245972 A1* | 9/2014 | Thiessen | B65D 88/744 122/18.3 |
| 2016/0327210 A1* | 11/2016 | Chaise | F17C 11/005 |

* cited by examiner

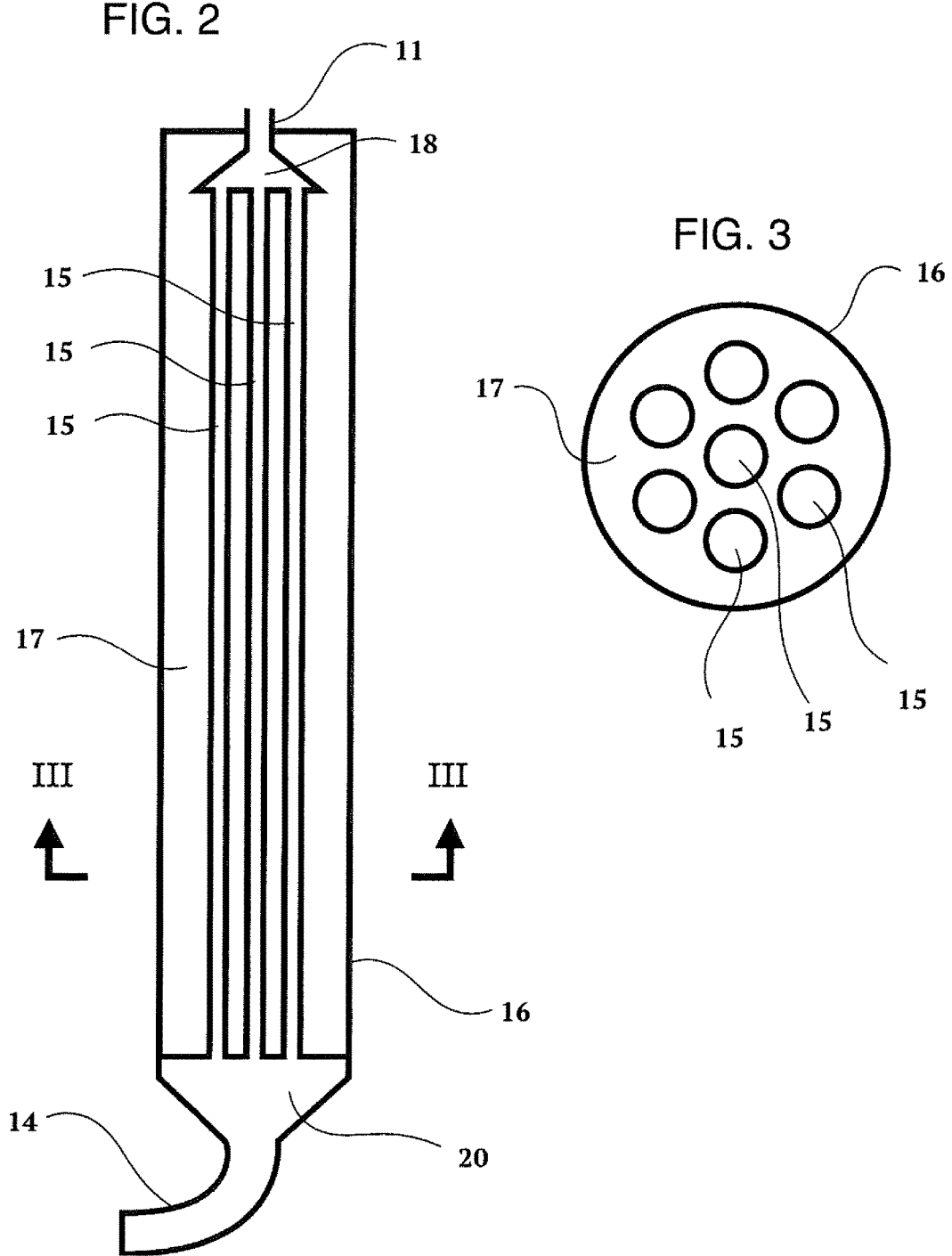

WATER HEATER WITH THERMALLY ISOLATING PREHEATER AND METHOD OF USE

This application claims priority from provisional patent application No. 62/278,459 filed on Jan. 14, 2016, and which is incorporated in its entirety herein.

FIELD OF THE INVENTION

A water heater includes a thermally isolating preheater using a phase change material for increased efficiency.

BACKGROUND

The latest energy efficiency standard for water heaters is NAECA III, which came into effect on Apr. 16, 2015. This standard mandates that new water heaters with capacities larger than fifty-five gallons have increased efficiency. This effectively limits the traditional and inexpensive water heater technology to capacities of fifty-five gallons or less. Water heater manufacturers are searching for a way to deliver more hot water from smaller capacity water heaters. One way to accomplish this is by storing heat in a material that that has a higher heat capacity than water, given the same volume. Such a material might be a phase change material that has a melting point near the temperature of hot water stored in domestic water heaters. An example of a phase change material is described in U.S. Pat. No. 8,887,762 to Junge et al., which is incorporated in its entirety herein. Simply encapsulating such a phase change material and locating it inside the storage tank of a water heater may improve its heat capacity but only in a limited manner for the added cost.

Most conventional water heaters draw hot water from the top of the tank and deliver incoming cold water to the bottom of the tank. Some water heaters have a cold water tap on the side near the bottom of the tank. Other water heaters have a cold water tap at the top of the tank. The latter has a cold water dip tube that carries incoming cold water from the top of the tank to the bottom of the tank. When hot water is drawn out of a water heater, the same amount of cold water enters and mixes with the rest of the stored hot water. This mixing of cold and hot water reduces the temperature of the stored water which reduces the amount of hot water that can be used. The term "draw efficiency" describes the percentage of hot water than can be drawn out of a water heater before the remaining water is considered too cold for use. Most conventional water heaters have a draw efficiency of about 70%. For example, a fifty gallon water heater with a draw efficiency of 70% can only deliver thirty-five gallons of hot water from its stored capacity without the help of its heating source.

There are several drawbacks of current technology utilizing phase change materials in water heaters. One downside is the low temperature difference between the phase change material and water due to cold water mixing with hot water before contacting the phase change material. This low temperature difference between the water and the phase change material slows down the heat transfer process. Another drawback is the added cost due to additional material and complexity in the water heater manufacturing process.

SUMMARY OF THE INVENTION

An improved water heater thermally isolates the incoming cold water from the stored hot water until it absorbs heat from a phase change material. This is accomplished by using a preheater inside the hot water storage tank. In the case of a water heater with a cold water dip tube, the preheater would replace the cold water dip tube. The preheater still provides a channel for incoming water to pass from the top to the bottom of the tank. However, this channel is surrounded by a second enclosure that is filled with a phase change material. This forces the cold incoming water to be heated by the phase change material before reaching the bottom of the tank and mixing with the stored hot water. This ensures a large temperature difference between the phase change material and the cold water, which allows heat stored in the phase change material to pass quickly into the incoming water.

By replacing the cold water dip tube with a preheater, the improved water heater can be made at a low cost and with minimal changes to existing manufacturing processes. The preheater can be made of similar materials to that of existing cold water dip tubes or other materials with more desirable characteristics. The preheater can be permanently fixed to the water heater storage tank. Alternatively, the preheater can be inserted through a threaded hole in the top of the water heater, similar to how a cold water dip tube is inserted. Another advantage of this method is that the preheater can be maintained or even replaced in the field.

The invention also includes a method of heating water including the inventive preheater and the preheater alone for situations where the preheater would be used to improve the efficiency of an existing water heater instead of being installed as part of a new water heater.

The following description and accompanying drawings will further illustrate these and other advantages.

BRIEF DESCRIPTION OF THE DRAWINGS

FIG. 2 presents a cross sectional view along line II-II of just the preheater shown in FIG. 1.

FIG. 3 illustrates a cross sectional view along line III-III of the preheater shown in FIG. 2.

DETAILED DESCRIPTION OF THE INVENTION

Figure 1:
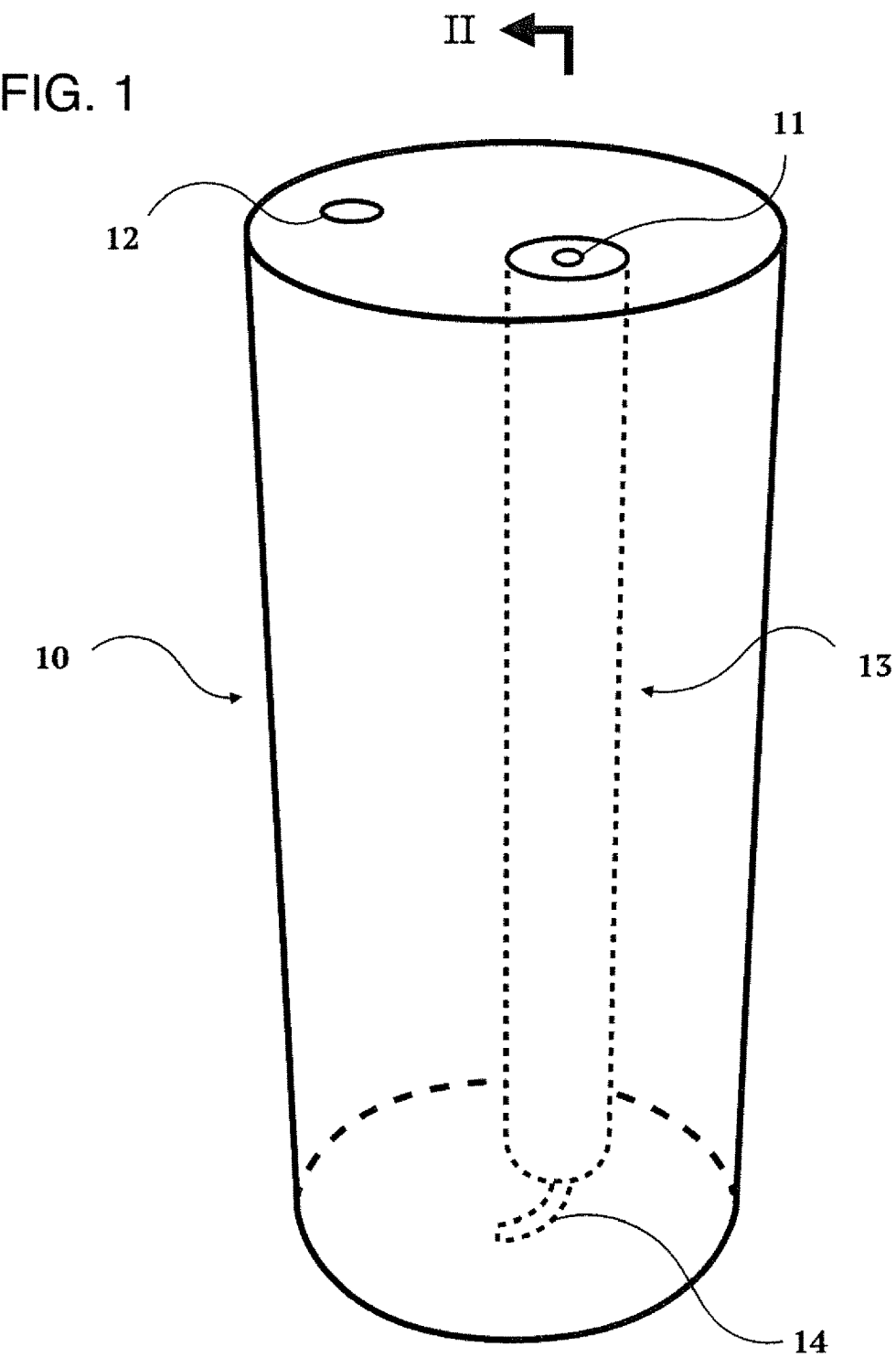
FIG. 1 shows a perspective view of a first embodiment of a water heater storage tank of the invention.

FIG. 1 illustrates a perspective view of a water heater storage tank 10 according to the first embodiment of this invention. Storage tank 10 includes many of the components of a typical water heater which are not shown because many of them remain unchanged. For instance, storage tank 10 typically includes one or more heating source such as electric resistance elements, heat pump refrigerant coils, or a combustion fuel heat exchanger. Storage tank 10 is typically insulated and contains a cold water inlet 11 and hot water outlet 12. When the cold water inlet 11 is located at the top of storage tank 10, it is typically attached to a cold water dip tube that delivers incoming cold water to the bottom of the storage tank 10.

Referring to FIGS. 1 and 3, a thermally isolating preheater 13 is shown oriented vertically, in place of a cold water dip tube. In this embodiment, preheater 13 is primarily a cylinder containing a phase change material 17 and flow channels 15 for the passage of incoming water. The preheater 13 can be fixed to the top of the storage tank 10 or inserted through a threaded hole in the top of the storage tank 10, similar to the way a cold water dip tube would be inserted. FIG. 1 illustrates an incoming water flow director 14 which can be curved as shown, or any other shape or size.

FIG. 2 presents a cross sectional view of the first embodiment of preheater 13, along the line II-II in FIG. 1. The first embodiment of preheater 13 has a cold water inlet 11 at the top, one or more water flow channels 15 extending from top to bottom, and a flow director 14 at the bottom. Preheater 13 has an outer shell 16. The space between the outer shell 16 and the flow channels 15 is filled with a phase change material 17 and may or may not include an air gap at the top to allow expansion of the phase change material 17 as it changes phase. In the case of multiple flow channels 15, the incoming water splits into a plurality of flow channels 15 that pass through the phase change material 17 before recombining at the outlet side of the preheater 13 by inlet header 18 and outlet header 20.

FIG. 3 shows a cross sectional view of the first embodiment of preheater 13, along the line III-III in FIG. 2. The first embodiment of preheater 13 has several flow channels 15 which are spaced such that they come in thermal contact with the phase change material 17 but not outer shell 16 or other flow channels 15. The materials for the preheater 13, i.e., the outer shell 16 and ends thereof can be made of any material suitable for use in the tank of a water heater.

Figure 4:
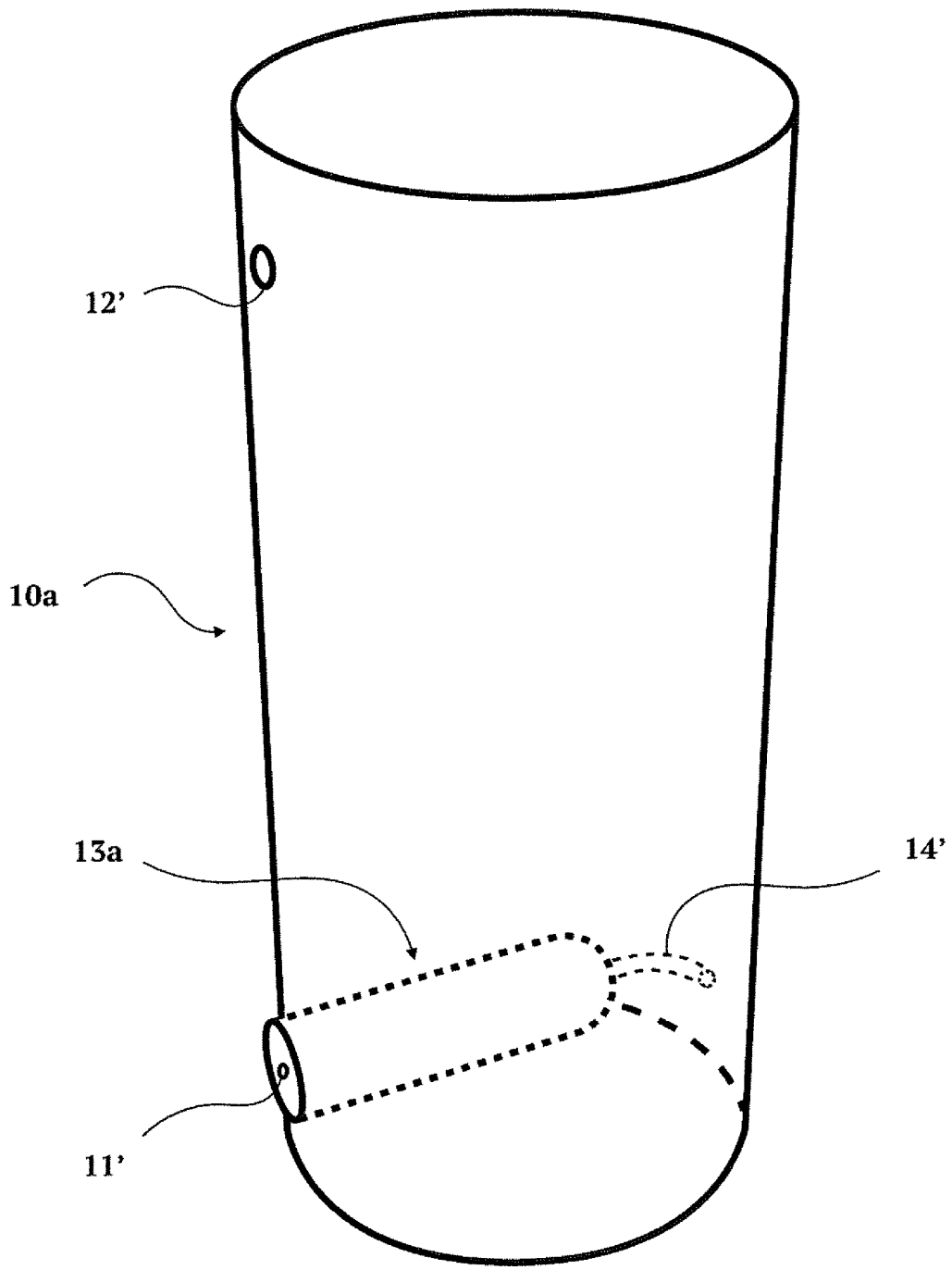
FIG. 4 presents a perspective view of a second embodiment of the preheater in a water heater storage tank.

FIG. 4 presents a perspective view of a water heater storage tank 10a according to the second embodiment of this invention. Storage tank 10a includes a cold water inlet 112 on the side of the tank near the bottom, and a hot water outlet 122 on the side of the tank near the top. Flow director 14 is opposite the cold water inlet 11. FIG. 4 shows the thermally isolating preheater 13a oriented generally horizontally. Although a vertical and horizontal orientation of the preheater is shown, the preheater can be in any orientation between the cold water inlet and a bottom of the storage tank 10.

Figure 5:
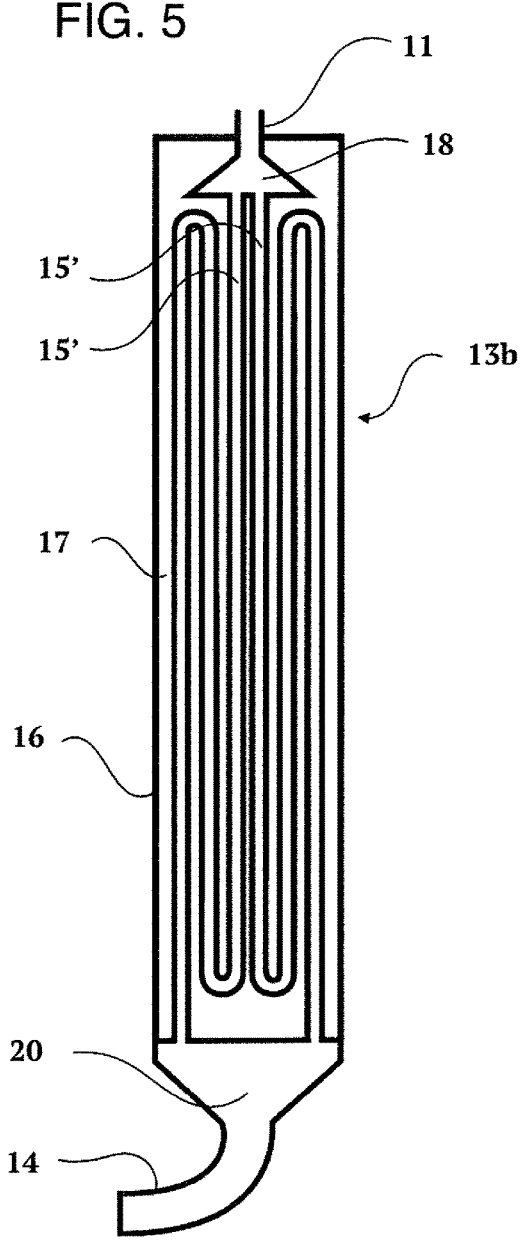
FIG. 5 shows a cross sectional view of a third embodiment of the preheater of the invention.

FIG. 5 illustrates a cross sectional view of an alternate embodiment of a preheater 13b, similar to the sectional view shown in FIG. 2. This third embodiment has a cold water inlet 11 at the top and a flow director 14 at the bottom. FIG. 5 shows one or more water flow channels 152 which pass between the inlet and outlet side of the preheater 13b two or more times in a countercurrent flow pattern before exiting the phase change material 17. In this embodiment, the flow channels 152 begin near the center of preheater 13b and turn outwards towards outer shell 16 when reversing directions. Flow channels 152 may reverse directions two or more times before finally exiting the preheater 13b. Alternatively, flow channels 152 can take any path that begins at the cold water inlet 11 and ends at the flow director 14.

Figure 6:
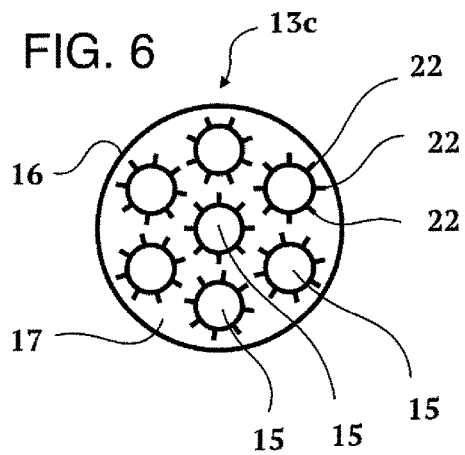
FIG. 6 shows a fourth embodiment of the preheater of the invention.

FIG. 6 shows a cross sectional view of an alternate embodiment of a preheater 13c, similar to the sectional view shown in FIG. 3. This fourth embodiment of preheater 13c has several flow channels 15 which are spaced such that they come in thermal contact with the phase change material 17 but not outer shell 16 or other flow channels 15. In this embodiment, heat sink fins 22 run lengthwise along an outer surface of the flow channels 15 to improve heat transfer between the incoming cold water and surrounding phase change material 17. Alternatively, heat sink fins 22 can be in any orientation and any shape that extend from a surface of the flow channels 15.

Figure 7:
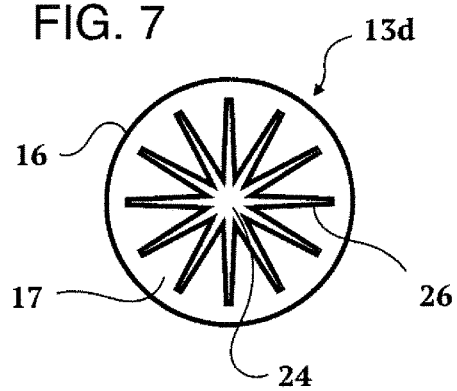
FIG. 7 shows a fifth embodiment of the preheater of the invention.

FIG. 7 presents a cross sectional view of an alternate embodiment of a preheater 13d, similar to the sectional view shown in FIG. 3. The fifth embodiment of preheater 13d has star-shaped channel that has a main flow channel 24 with narrow channels 26 extending out from the main flow channel 24 such that they come in thermal contact with the phase change material 17 but not outer shell 16.

Figure 8:
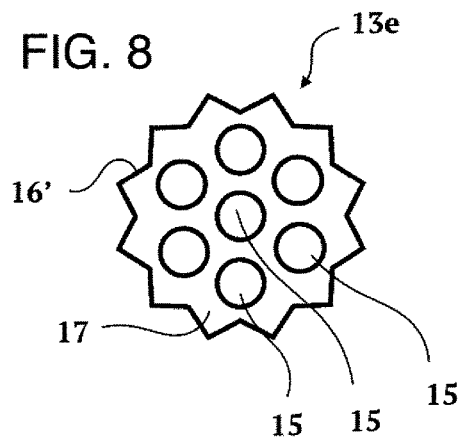
FIG. 8 shows a sixth embodiment of the preheater of the invention.

FIG. 8 shows a cross sectional view of an alternate embodiment of a preheater 13e, similar to the sectional view shown in FIG. 3. This sixth embodiment of preheater 13e has several flow channels 15 which are spaced such that they come in thermal contact with the phase change material 17 but not outer shell 16 or other flow channels 15, similar to those in FIG. 3. In this embodiment, the outer shell 162 has an angular shape to allow it to maintain its structural integrity as it expands and contracts due to changes in volume of the phase change material 17. The shape of FIG. 8 is an example of a textured outer shell shape and the outer shell shape can have other undulations, curves, or textures, e.g., be non-circumferential, to allow for expansion and contraction.

In operation and referring to the FIG. 1 embodiment, a plumbing system would draw hot water in a normal manner from the storage tank 10. As hot water is drawn from the hot water outlet 12 at top of the storage tank, the same volume of cold water enters through the cold water inlet 11. The entering cold water passes directly into the water flow channels 15 located inside the thermally isolating preheater 13. As the cold water passes through the flow channels 15, the water rapidly absorbs heat stored in the phase change material 17. One advantage of this design over the prior art is that the incoming cold water is thermally isolated from the stored hot water until it comes in thermal contact with the phase change material 17. This thermal isolation results in a large temperature difference between the incoming water and phase change material which promotes a more rapid heat transfer than is achieved by the prior art.

Another advantage of this embodiment is that the preheater 13 prevents incoming water from mixing with stored hot water until it has been substantially preheated by the phase change material 17. Thus, rather than cold water emerging from the inlet 11 or dip tube as is the case in conventional water heaters, hot water emerges from the exit end of the preheater 13. Since a 70% draw efficiency can be achieved with direct mixing of cold and hot water, higher draw efficiencies can be achieved using the inventive preheater 13.

Over the course of a long hot water draw, the phase change material 17 will become solid and temporarily depleted of its stored heat. As this occurs, water leaving the preheater 13 will become cooler. One or more thermostats can be provided to recognize the change in temperature and activate the heat source for the water heater. Long hot water draws can be achieved by setting the thermostat to activate the heat source before the preheater 13 is fully exhausted.

Figure 9:
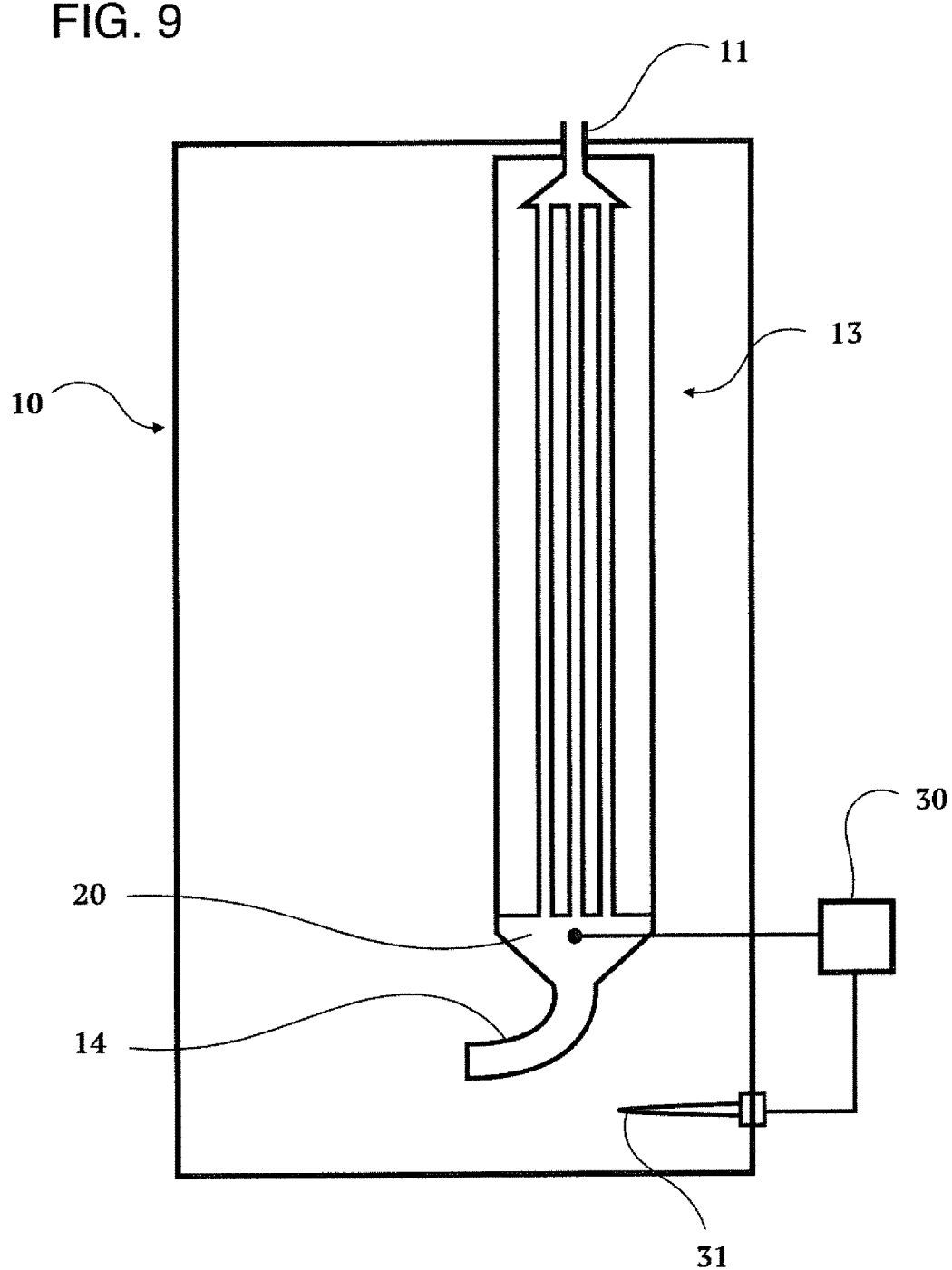
FIG. 9 shows a schematic drawing showing thermostat control of the preheater for a storage tank.

FIG. 9 shows a schematic drawing with a thermostat 30 sensing temperature at the outlet header 20. The heater 31 is turned on when the temperature of the water exiting the preheater is below a set temperature and turned off when the temperature of the water reaches a desired temperature. Once the long draw has finished, the heat source will continue to reheat the water until one or more thermostats is satisfied. The one or more thermostats can be set such that it is not satisfied until hot water has replenished the phase change material 17, returning it to its high energy liquid state.

As such, an invention has been disclosed in terms of preferred embodiments thereof which fulfills each and every one of the objects of the present invention as set forth above and provides a new and improved way to increase the efficiency of a water heater.

Of course, various changes, modifications, and alterations from the teachings of the present invention may be contemplated by those skilled in the art without departing from the intended spirit and scope thereof. It is intended that the present invention only be limited by the terms of the appended claim.

I claim:

1. A water heater preheater for a water heater, the water heater preheater comprising:
   a container having a container inlet and a container outlet with a container outer wall disposed between the container inlet and container outlet, the container having a phase change material therein,
   the container wall, the container inlet, and container outlet forming a one piece structure sized to fit inside of a water heater and be spaced from an inner wall of the water heater, the container also including an inlet header in communication with the container inlet and an outlet header and a plurality of channels, the plurality of channels extending between the inlet header and the outlet header, the plurality of channels substantially surrounded by the phase change material, at least the inlet header being part of the one-piece structure, the container inlet having a connection allowing the container inlet to be fixed or threaded to the water heater,
   the container inlet adapted to be connected to a cold water inlet of the water heater such that cold water from the cold water inlet of the water heater first passes through the plurality of channels and is preheated by the phase change material prior to discharge from the container outlet to water in the water heater.

2. The preheater of claim 1, further comprising a flow director extending from the container outlet for discharge of preheated cold water.

3. The preheater of claim 1, wherein the plurality of channels form a star shape in cross section.

4. The preheater of claim 1, wherein the container has a cylindrical shape.

5. The preheater of claim 1, wherein the container outer wall has a non-circumferential surface.

6. The preheater of claim 1, wherein the plurality of the channels are arranged in the container to have water flow both in one direction and a direction counter to the one direction from the inlet to the outlet.

7. The preheater of claim 1, wherein each of the channels of the plurality of channels includes fins extending from an outer surface thereof.

8. A water heater having a tank with cold water inlet, a hot water outlet, and a heater for heating water stored in the tank, the water heater including a preheater, the preheater further comprising:
   a container having a container inlet and a container outlet with a container outer wall disposed between the container inlet and container outlet, the container having a phase change material therein,
   the container wall, the container inlet, and container outlet forming a one piece structure sized to fit inside of the water heater and be spaced from an inner wall of the water heater, the container also including an inlet header in communication with the container inlet and an outlet header and a plurality of channels, the plurality of channels extending between the inlet header and the outlet header, the plurality of channels substantially surrounded by the phase change material, at least the inlet header being part of the one-piece structure, the container inlet having a connection allowing the container inlet to be fixed or threaded to the water heater,
   the container inlet connected to a cold water inlet of the water heater such that cold water from the cold water inlet of the water heater first passes through the plurality of channels and is preheated by the phase change material prior to discharge from the container outlet to water in the water heater.

9. The water heater of claim 8, wherein the preheater is positioned either generally vertically or generally horizontally in the tank.

10. The water heater of claim 8, wherein the water heater includes at least one thermostat positioned in the outlet header to monitor temperature of preheated water of the container for control of heating of water in the tank.

11. In a method of heating water using a water heater having a tank with cold water inlet, a hot water outlet, and a heater for heating water stored in the tank, the improvement comprising providing the preheater of claim 1 to first receive cold water entering the tank for preheating and then discharge water from the preheater to water held in the tank.

12. The water heater of claim 8, further comprising a flow director extending from the outlet of the container for discharge of preheated cold water.

13. The water heater of claim 8, wherein the plurality of channels form a star shape in cross section.

14. The water heater of claim 8, wherein the container has a cylindrical shape.

15. The water heater of claim 8, wherein the container outer wall having a non-circumferential surface.

16. The water heater of claim 8, wherein the plurality of the channels are arranged in the container to have water flow both in one direction and a direction counter to the one direction from the inlet to the outlet.

* * * * *